United States Patent [19]

Parker

[11] Patent Number: 4,829,490

[45] Date of Patent: May 9, 1989

[54] ELECTRICAL SIGNAL DISCRIMINATION

[75] Inventor: John A. Parker, Warrington, England

[73] Assignee: United Kingdom Atomic Energy Authority, London, England

[21] Appl. No.: 760,956

[22] Filed: Jul. 31, 1985

[30] Foreign Application Priority Data

Aug. 31, 1984 [GB] United Kingdom ............... 8422022

[51] Int. Cl.$^4$ .............................................. G01S 9/66
[52] U.S. Cl. ...................................... 367/98; 367/900
[58] Field of Search .................... 367/98, 95, 97, 900, 367/908, 93; 342/159-161, 196

[56] References Cited

U.S. PATENT DOCUMENTS

| 3,896,411 | 7/1975 | Mackey et al. | 367/98 |
| 4,290,126 | 9/1981 | McFadyen et al. | 367/93 |
| 4,315,325 | 2/1982 | Blades | 367/98 |
| 4,401,987 | 8/1983 | Cyr | 367/97 |
| 4,499,564 | 2/1985 | Sirai | 367/93 |
| 4,512,000 | 4/1985 | Masuko | 367/93 |

FOREIGN PATENT DOCUMENTS

| 1486721 | 9/1977 | United Kingdom . |
| 2007061 | 5/1979 | United Kingdom . |
| 1583829 | 2/1981 | United Kingdom . |
| 2109110 | 5/1983 | United Kingdom . |

OTHER PUBLICATIONS

Schilling et al., Electronic Circuits, 1979, pp. 719-722.

Primary Examiner—Thomas H. Tarcza
Assistant Examiner—Daniel T. Pihulic
Attorney, Agent, or Firm—William R. Hinds

[57] ABSTRACT

The electrical response of a transducer contains a data-providing signal or signals superimposed on an unwanted time-variable background signal which is independent of the data-providing signal or signals. A system processing the transducer response utilizes an electronically stored digital simulation of the background components whereby combination of the transducer output with the digital simulation, after digital to analogue conversion of the latter, substantially frees the transducer output of the background component to facilitate detection of the data-providing signals.

12 Claims, 4 Drawing Sheets

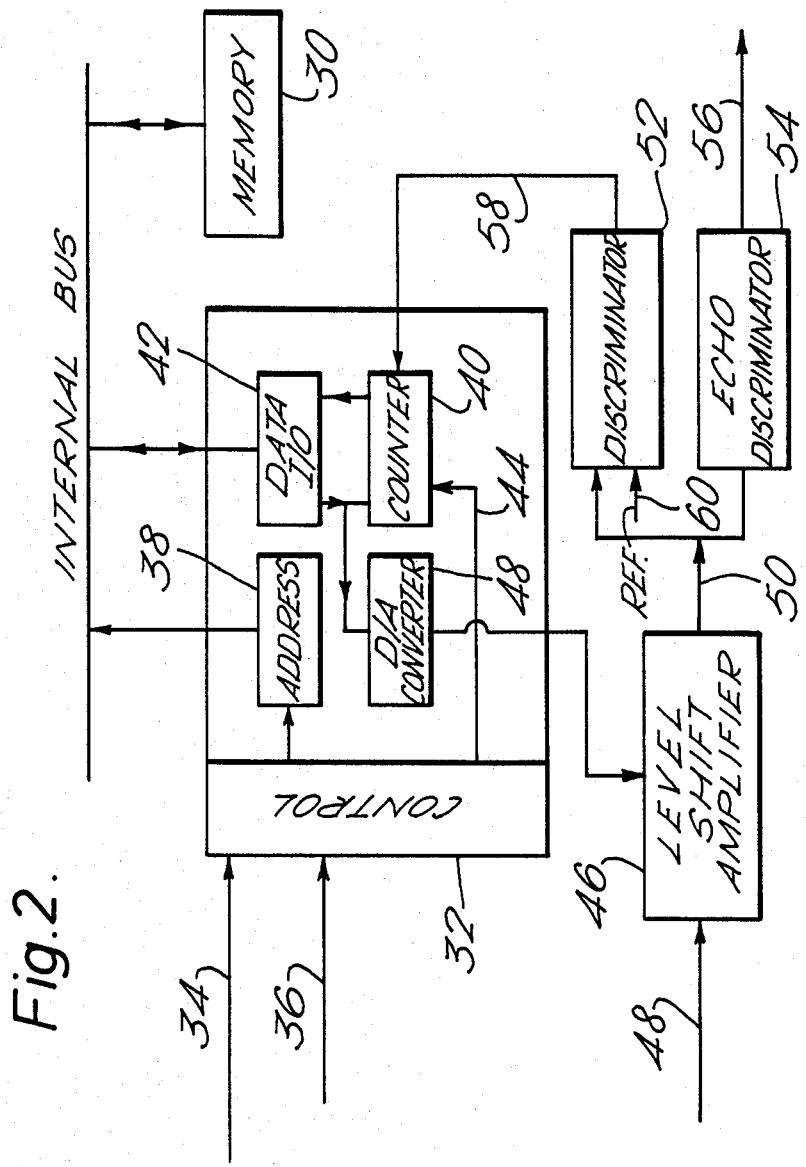

ELECTRICAL SIGNAL DISCRIMINATION

BACKGROUND OF THE INVENTION

This invention relates to the processing of electrical signals so as to discriminate between signal components of interest and unwanted background signal noise. The invention is particularly (but not necessarily exclusively) applicable to ultrasonic pulse-echo techniques where the background noise is largely attributable to reverberation effects resulting from pulsing of the pulse transmitter coupled with the random electrical noise level of the conditioning electronics.

The reverberation effects accompany the transmitted pulse and decay in an approximately exponential manner, being superimposed on the electrical noise level of the electronics. The echo pulses are likewise superimposed on the electrical noise level and are required to be distinguished from the background noise.

In general, the output signal is gated for a suitable interval of time during which the echo pulses are expected to be available for detection. Such gating will usually eliminate the larger amplitude reverberation effects as these will have decayed substantially before the commencement of the gating interval. Nevertheless, in many cases, the gating interval will embrace some of the reverberation components as well as the electrical noise component.

One approach of achieving discrimination is to impose a fixed level threshold of suitable amplitude and, to avoid spurious signals, the threshold level must be selected to be above the largest amplitude reverberation effects that are likely to occur during the gating interval.

This is subject to a number of drawbacks however: the magnitude of the threshold level may result in loss of low amplitude echo signals; the threshold level may need to be modified if the gating interval is changed or shifted; useful information may be lost in case of signal components not falling within the gating interval; and the reverberation effects vary from one ultrasonic transducer to another with the consequence that the threshold levels may likewise differ for different transducers of the same design.

FEATURES AND ASPECTS OF THE INVENTION

The object of the present invention is to provide improvements in signal discrimination.

According to one aspect of the present invention there is provided a method of simulating the time-variable background signal component inherent in the electrical response of a transducer whose response includes a data-providing signal or signals superimposed on said background signal, said background signal comprising a first decaying component attributable to reverberation of the transducer and a second ever-present electrical noise component contributed by electronics associated with the transducer, said method comprising: operating said transducer to produce a first response; initially storing in digital form a plurality of threshold values which collectively approximate the envelope of said first response; operating the transducer to produce a second response with a different data-providing signal distribution; and modifying said stored threshold values so that they collectively approximate an envelope corresponding to the transducer background signal component freed of the data-providing signals present in said first and second responses, the method including combining said initially stored threshold values with said second response to derive an output in which the data-providing signal component(s) of said first response are inverted with respect to the data-providing signal component(s) of the second response and modifying said threshold values so as to cancel the data-providing signal component(s) of the first response from said combined output.

According to another aspect of the invention, there is provided a signal processing system comprising input means for connection to or connected to a transducer producing a response which may contain a data-providing signal or signals superimposed on an unwanted time-variable inherent background signal which is independent of said data-providing signal(s) and comprises a first decaying component attributable to reverberation of the transducer and a second ever-present electrical noise component contributed by electronics associated with the transducer, digital storage means for storing a plurality of threshold values which correspond to successive intervals of time and collectively approximate the envelope of said time-varying background signal, said stored threshold values having been derived by a method comprising operating the transducer to produce a first response, initially storing in digital form a plurality of threshold values which collectively approximate the envelope of the first response, operating the transducer to produce a second response with a different data-providing signal distribution, and modifying the stored threshold values so that they collectively approximate an envelope corresponding to the transducer background signal component free of the data-providing signals present in the first and second responses, said method including combining the initially stored threshold values with the second response to derive an output in which the data-providing signal component(s) of said first response are inverted with respect to the data-providing signal component(s) of the second response and modifying said threshold values so as to cancel the data-providing signal component(s) of the first response from said combined output, said signal processing system further comprising means for retrieving said threshold values from said storage means and combining each with a corresponding time-interval portion of the transducer response so as to at least substantially nullify the background signal contribution to the transducer response during such time interval, and means for monitoring the transducer response for the presence of data-providing signals.

Further features of the invention will become apparent from the following description and appended claims.

DESCRIPTION OF THE DRAWINGS

To promote further understanding of the invention, one example will now be described with reference to the accompanying drawings, in which:

FIG. 2 is a block diagram of a signal processing system in accordance with the invention.

DESCRIPTION OF PREFERRED EMBODIMENT

The system shown in FIG. 2 is primarily intended for use in ultrasonic imaging in liquid metal cooled fast breeder reactors wherein echos from a group of sodium immersible pulse-echo transducers are collected and stored, the transducers being pulsed sequentially as they are moved progressively over the target to be imaged. Efficient scanning of the target depends on maximising the amount of data collected in a given time.

Figure 1A:
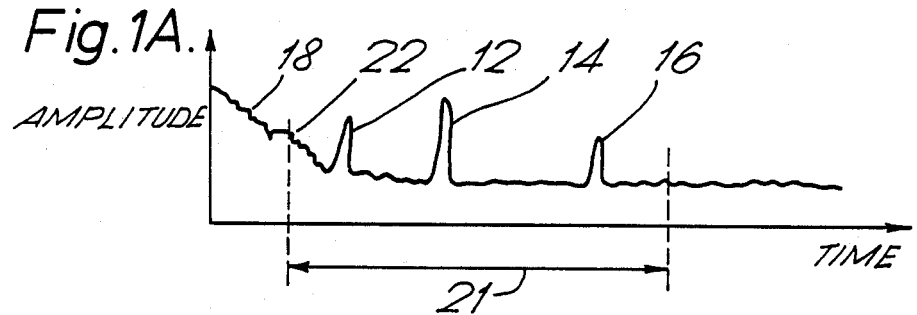
FIGS. 1A–K are diagrammatic graphs which illustrate the various stages during the calibration procedure for deriving a digital simulation of the background component present in the transducer output.

FIG. 1A illustrates a typical transducer response obtained which consists of echos 12, 14, 16 superimposed on a background noise level comprising electrical noise produced by the electronics associated with the transducers and reverberation effects resulting from firing of the transducer. The electronics noise is present at all times whereas the reverberation component (which is indicated by reference numeral 18) decays substantially exponentially (with some superimposed fine structure) to the level of the electronics noise. Thus, at the left hand side of the trace, the reverberation component predominates whereas the electronics noise dominates at the right hand side.

The signal may be gated as shown by reference numeral 21 to define the area of interest. To discriminate between background noise and the signal components of interest, ie. the echos, a fixed threshold level may be imposed. For best sensitivity with this approach, it will be seen that the threshold level must be set slightly above the maximum amplitude peaks, eg. 22, of the background noise, otherwise background peaks can be confused with echos. However, the use of a fixed level may result in loss of useful data since relatively small amplitude echos will be masked. It will be seen that during typical gating period, the background may contain a significant contribution from the decaying reverberation component.

In accordance with the invention, the drawbacks associated with the use of a fixed threshold level are largely overcome by producing a threshold trace which follows closely the variations in the background signal (reverberation plus electronics noise). Derivation of the threshold trace will be described herein below. The threshold trace is derived for each transducer and is stored in digital form as a large number of threshold values in assigned memory addresses of an electronic memory 30 (see FIG. 2), each threshold level being associated with a particular interval of time relative to a datum, eg. the transmitted pulse. Thus, the group of memory locations corresponding to a particular transducer will store a series of threshold values which, when taken in the appropriate sequence, will collectively approximate the envelope of the background characteristic of that transducer so that the real-time background can be nullified by the threshold trace.

As shown in FIG. 2, the circuitry comprises a central control 32 which receives, via input lines 34 and 36, the transmit signals from the transducers as they fire and data enabling the transducers to be identified. As mentioned, certain memory locations are reserved in the memory 30 for each transducer and the identification signals received on input line 36 enable the control 32 to address, via 38, those memory locations associated with the respective transducer whereby the contents of those memory locations can be loaded into an up/down counter 40 via input/output device 42. Line 44 from the control 32 allows counting pulses to be applied to the counter for the purposes explained below.

The input/output device 42 is also connected to a level shift amplifier 46 via D/A converter 48 whereby the signal level of the amplifier may be shifted in dependence upon the analogue counterparts of the digital signals obtained from the memory 30. The transducer signals are applied to the amplifier 46 via input line 48 and the output 50 of amplifier is connected to a pair of discriminators 52, 54. The discriminator 54 serves to detect echos which are supplied to echo-processing circuitry via output line 56 for analysis using conventional techniques whereby, for instance, the time intervals elapsing between echo signals and a datum signal (eg. the transmitted signal) can be determined.

The discriminator 52 is connected to the counter 40 via line 58 and determines the direction of counting according to whether the output on line 50 is greater or smaller than a reference signal (which may be produced by the control 32) applied to input 60 of the discriminator 52.

After initial calibration, the memory locations associated with each transducer will store a large number of digital values which can be applied sequentially via the D/A converter 48 to the level shifting input of the amplifier 46 so that level of the latter is continually varied in dependence upon the contribution made by the background component of its signal trace. In this way, the background component is effectively nullified so as to leave only the data-providing signal, ie. the echos, which can then be supplied to the echo processing circuitry via discriminator 54.

The calibration procedure for one transducer will now be described. Typically the signal trace of the transducer is as shown in FIG. 1 which has been described earlier. The first stage in the calibration procedure involves storing, in an assigned area of memory 30, a digital simulation of the transducer trace shown in FIG. 1. It will be understood that each time the transducer is fired, it will generate the same trace provided all other factors, eg. transducer position etc., remain unchanged. Initially, the contents of the memory 30 will all be zero or some other arbitary value. Each time the transducer is fired, the control 32 initiates a sequence in which the contents of different addresses in the memory are loaded into the counter 40 and also into the converter 48. It will be appreciated that the time interval in which each step of the sequence is executed will be very short, ie. a few milliseconds, so that during each sequence a large number of steps will be involved.

During the first stage of calibration, a predetermined reference signal is applied to the input 60 of the discriminator 52. Each step of the sequence involves shifting the level of the amplifier 46 according to the digital value loaded into the converter 48 and comparing the output on line 50 with the reference signal on line 60. If the comparison shows that the amplifier output exceeded the reference level, the discriminator produces a signal on line 58 which places the counter 40 in a decrement mode. If not, a signal is applied to line 58 to place the counter in an increment mode. During each step, a predetermined number of pulses (eg. 1) is supplied to the counter 40 by the control 32 so that the counter is decremented or incremented by that number of pulses, depending on the mode signal applied via line 58. The updated contents of the counter 40 are then loaded back into the respective memory address in the memory 30.

Figure 1B:
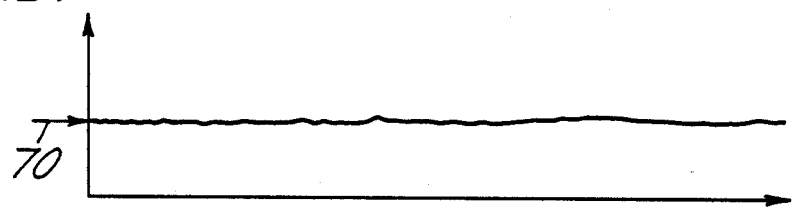
Figure 1C:
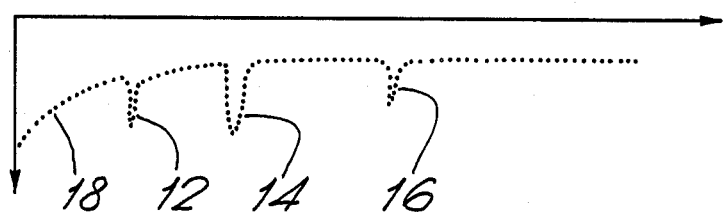
Figure 1D:
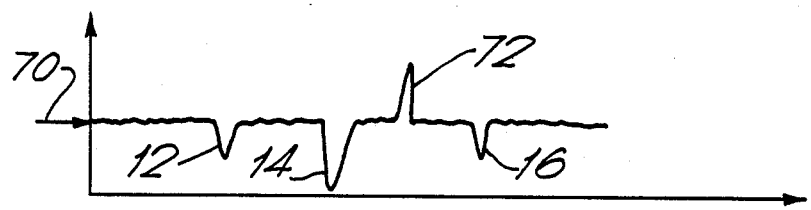

This procedure is repeated for each successive memory address until the entire span of the transducer trace (over the time interval of interest) has been covered and the cycle is then repeated until the digital values stored by the memory addresses substantially correspond to respective analogue values of the transducer trace. The result of the first stage can be seen from FIGS. 1B and 1C. FIG. 1B shows the compensated output on line 50 which will be seen to fluctuate to a small extent only about the reference level indicated by reference number 70. FIG. 1C shows the simulated transducer trace provided collectively by the digital values stored in the memory 30, each digital value being shown as a dot in FIG. 1C.

Although as described above, the contents of each memory address is loaded into the counter and then returned to that address (after incrementing or decrementing) during the same step, in practice the arrangement may be such that incrementing or decrementing of the contents of one address and return to memory takes place while the next address is being loaded into the converter 48. Also, after the calibration procedure has reached the point where the echos are zeroed out by the compensating signals stored in memory, the decrement mode of the counter may be inhibited temporarily so that only incrementing is possible. In this way, stored digital value can be adusted so that the compensated output on line 50 is just above the reference level 70 applied to input 60.

Figure 1E:
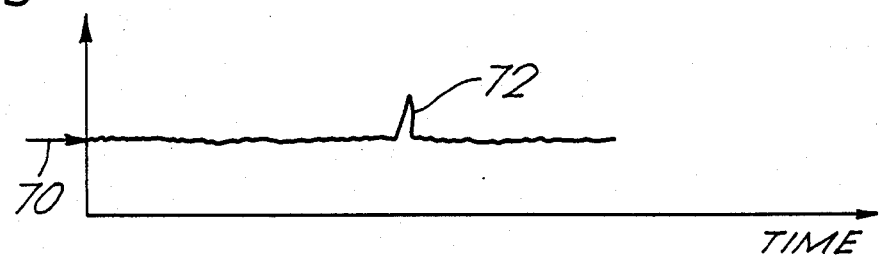
Figure 1F:
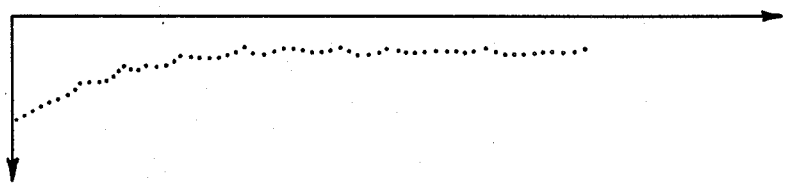

From FIG. 1C, the simulated trace can be seen to contain echos 12, 14, 16 as well as reverberation and electrical noise components. The second calibration stage involves freeing the simulation of the echo components and this is achieved by causing the transducer to produce a trace with differently positioned echos, eg. by changing the positional relationship between the transducer and a scanned target. In general, such a change will only alter the positions of the echos and the envelope of the reverberation and electrical noise components will remain substantially the same for a given transducer and associated conditioning circuitry. Thus, for example, the changes made result in the compensated output on line 50 being of the form shown in FIG. 1D in which the old echos 12, 14, 16 are seen in inverted form (even though they are no longer present in the transducer trace) and a new echo 72 is superimposed on the otherwise substantially constant output. At this time, the procedure of the first calibration stage is repeated but with decrementing of the counter 40 disabled so that stored digital values in memory are adjusted to eliminate only the inverted echos. The resulting output on line 50 is indicated in FIG. 1E and the corresponding digital simulation collectively represented by the stored digital values is shown in FIG. 1F which, at this time, will be a close approximation to the envelope of the reverberation and electrical noise components of the transducer.

Figure 1G:
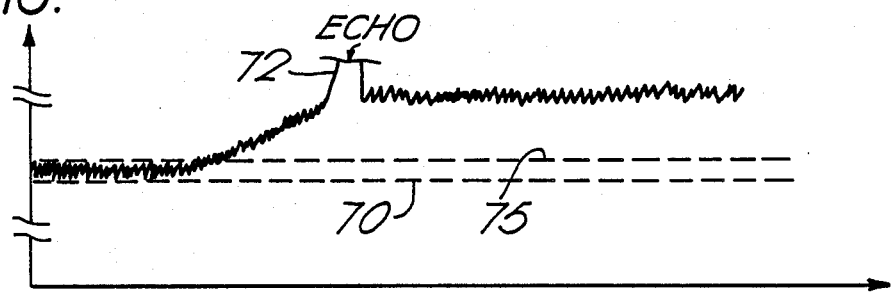

Although the simulation provided by the first two stages of calibration may suffice in some instances, a further sophistication is possible. Close examination of the output on line 50 reveals that the background level tends to rise with time, especially in that part of the trace dominated by the electrical noise component. This is illustrated by FIG. 1G which shows part of the trace magnified. At the left hand side, the reverberation component predominates and the signal level in this region is close to the reference level 70. At the right hand side, the electrical noise component predominates and because of random fluctuations, the signal peaks in this region tend to be somewhat above the reference level 70.

Figure 1H:
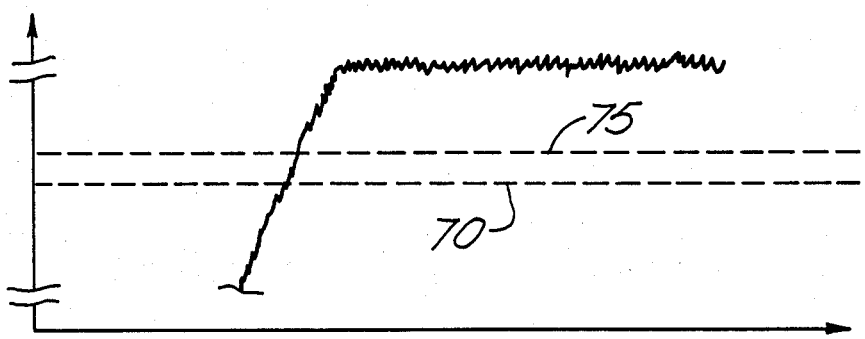
Figure 1I:
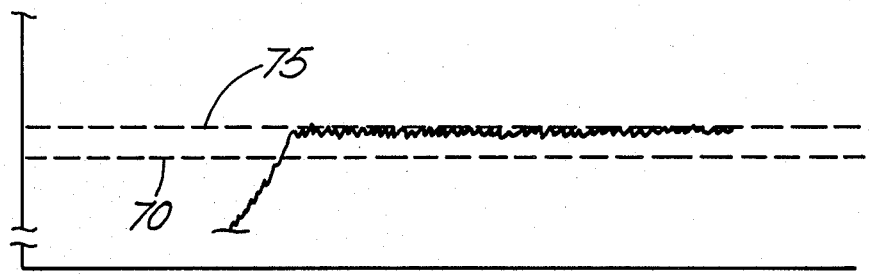
Figure 1J:
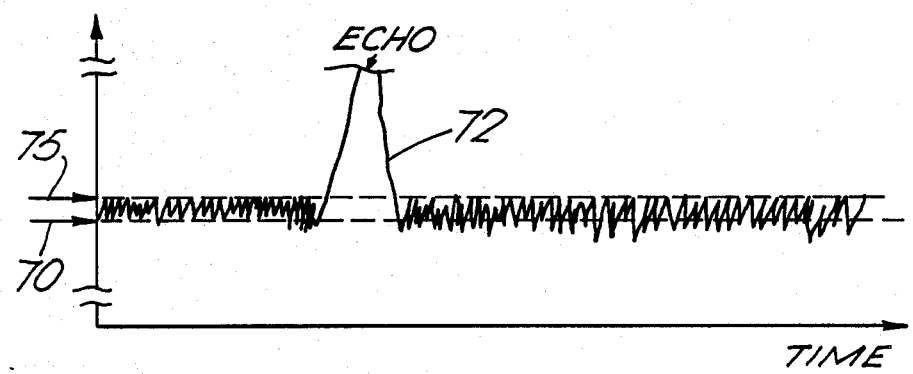
Figure 1K:
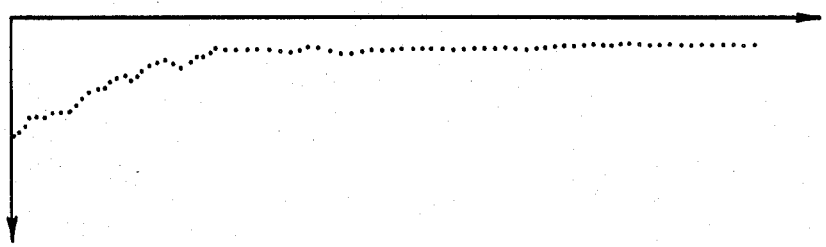

To compensate for this effect, in the third calibration step, the transmitter pulse is inhibited as a result of which the compensated output on line 50 will appear as shown in FIG. 1H. Incrementing of the counter 40 is also inhibited and the procedure of the first stage is then repeated but with the increment inhibit imposed and a second reference level 75 applied at input 60 of the discriminator 52. The second reference level 75 may be selected so that it is slightly above the peaks of the reverberation dominated part of the background level. The resulting decrementing of the contents of the memory leads to a compensated output on line 50 of the form shown in FIG. 1I and when transmitter firing is resumed, the output will be as shown in FIG. 1J in which all of the background peaks are substantially masked by the second reference level 75. At this time, the digital simulation may be shown in FIG. 1K.

It will be understood that following derivation of a digital simulation for each transducer, that simulation may be used for the respective transducer in subsequent scanning operations so as to effectively eliminate the background level and facilitate detection of the data-providing signals.

In the foregoing description with reference to the drawings, compensation of the transducer output is achieved by combining the digital simulation (following conversion to analogue form) with the transducer output by means of a level shift amplifier wherein the level shift is determined by the stored digital values. However, other ways of combining the digital simulation with the transducer output may be employed, eg. instead of modulating the level or gain shift of an amplifier, the digitally stored values may be used to modulate the discriminator 52.

I claim:

1. A method of simulating the time-variable background signal component inherent in the electrical response of a transducer whose response includes a data-providing signal or signals superimposed on said background signal, said background signal comprising a first decaying component attributable to reverberation of the transducer and a second ever-present electrical noise component contributed by electronics associated with the transducer, said method comprising: operating said transducer to produce a first response; initially storing in digital form a plurality of threshold values which collectively approximate the envelope of said first response; operating the transducer to produce a second response with a different data-providing signal distribution; and modifying said stored threshold values so that they collectively approximate an envelope corresponding to the transducer background signal component freed of the data-providing signals present in said first and second responses, the method including combining said initially stored threshold values with said second response to derive an output in which the data-providing signal component(s) of said first response are inverted with respect to the data-providing signal component(s) of the second response and modifying said threshold values so as to cancel the data-providing signal component(s) of the first response from said combined output.

2. A method as claimed in claim 1 further comprising the steps of temporarily eliminating the source of said reverberation component so that only said second component is present; combining said second component with said threshold values; and, where said combined signal lies within a predetermined range from a reference value, increasing the magnitude of the corresponding threshold values to converge said combined signal towards said reference value, the resulting threshold values thereafter being used to process subsequent transducer responses.

3. A method as claimed in claim 1 in which there is a plurality of transducers and the method is applied to each transducer to derive and store a set of theshold values for each transducer and in which subsequent processing of each transducer response includes the step of combining said response with the respective set of stored threshold values.

4. A signal processing system comprising input means for connection to or connected to a transducer producing a response which may contain a data-providing signal or signals superimposed on an unwanted time-variable inherent background signal which is independent of said data-providing signal(s) and comprises a first decaying component attributable to reverberation of the transducer and a second ever-present electrical noise component contributed by electronics associated with the transducer, digital storage means for storing a plurality of threshold values which correspond to successive intervals of time and collectively approximate the envelope of said time-varying background signal, said stored threshold values having been derived by a method comprising operating the transducer to produce a first response, initially storing in digital form a plurality of threshold values which collectively approximate the envelope of the first response, operating the transducer to produce a second response with a different data-providing signal distribution, and modifying the stored threshold values so that they collectively approximate an envelope corresponding to the transducer background signal component free of the data-providing signals present in the first and second responses, said method including combining the initially stored threshold values with the second response to derive an output in which the data-providing signal component(s) of said first response are inverted with respect to the data-providing signal component(s) of the second response and modifying said threshold values so as to cancel the data-providing signal component(s) of the first response from said combined output, said signal processing system further comprising means for retrieving said threshold values from said storage means and combining each with a corresponding time-interval portion of the transducer response so as to at least substantially nullify the background signal contribution to the transducer response during such time interval, and means for monitoring the transducer response for the presence of data-providing signals.

5. A system as claimed in claim 4 including means for monitoring the position of the or each transducer in relation to a predetermined datum position whereby the data-providing signals can be correlated with scanning movements of the transducer or transducers.

6. A system as claimed in claim 4 including means for selectively gating the transducer response whereby processing as aforesaid can be restricted to a preselected portion of said response likely to contain data-providing signals of interest.

7. A system as claimed in claim 4 in which said combining means is operable, during each said time interval, to shift the signal level of the transducer response by an amount relating to the corresponding threshold value whereby, in the absence of data-providing signals, the transducer response is translated into a substantially constant amplitude output.

8. A system as claimed in claim 4 in which said combining means is operable to effect combining by comparing the transducer response prevailing during each said time interval with the respective threshold value and to provide an output indicative of a data-providing signal if the transducer response exceeds the corresponding threshold value by a predetermined amount.

9. A system as claimed in claim 4 in which said monitoring means is operable to determine the time elapsing between the occurrence of the or each data-providing signal and a datum signal.

10. A system as claimed in claim 4 in which said threshold values are converted from digital to analogue form prior to combination with the respective portions of the transducer response.

11. A system as claimed in claim 4 in which said portions of the transducer response are converted into digital form prior to combination with the respective threshold values.

12. A system as claimed in claim 4 in which said input means is connectable or connected to a plurality of transducers and said storage means contains a set of threshold values associated with each transducer, control means being provided for selectively enabling transmission of said transducer responses to said combining means together with the associated threshold values whereby the transducer responses may be investigated for data-providing signals in a predetermined sequence.

* * * * *